(12) United States Patent
Onishi

(10) Patent No.: US 10,165,356 B1
(45) Date of Patent: Dec. 25, 2018

(54) METHODS AND APPARATUS FOR CONTROLLING A BIAS VOLTAGE

(71) Applicant: SEMICONDUCTOR COMPONENTS INDUSTRIES, LLC, Phoenix, AZ (US)

(72) Inventor: Akinobu Onishi, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 23 days.

(21) Appl. No.: 15/613,437

(22) Filed: Jun. 5, 2017

(51) Int. Cl.
  *H04R 3/00* (2006.01)
  *H02M 3/07* (2006.01)
  *H04R 19/00* (2006.01)

(52) U.S. Cl.
  CPC ............... *H04R 3/00* (2013.01); *H02M 3/07* (2013.01); *H04R 19/005* (2013.01); *H04R 2201/003* (2013.01); *H04R 2410/03* (2013.01)

(58) Field of Classification Search
  CPC .. H04R 3/00; H04R 19/005; H04R 2201/003; H04R 2410/03
  USPC ................................................. 381/113, 174
  See application file for complete search history.

(56) References Cited

U.S. PATENT DOCUMENTS

| 6,107,862 A | 8/2000 | Mukainakano |
| 2009/0034650 A1 | 2/2009 | Norimatsu |
| 2009/0102439 A1 | 4/2009 | Williams |
| 2010/0166228 A1* | 7/2010 | Steele ............ A61B 8/4444 381/113 |
| 2010/0171372 A1 | 7/2010 | Kim |
| 2011/0150243 A1* | 6/2011 | Onishi ............ H02M 3/07 381/111 |
| 2011/0170714 A1* | 7/2011 | Hanzlik .......... H02M 3/07 381/111 |
| 2013/0195291 A1* | 8/2013 | Josefsson ....... H02M 1/12 381/174 |
| 2015/0110295 A1* | 4/2015 | Jenkner ........... H04R 1/08 381/114 |
| 2015/0180333 A1* | 6/2015 | Jenkner ........... H02M 3/07 327/536 |
| 2015/0181352 A1* | 6/2015 | Astgimath ..... H04R 3/00 381/174 |
| 2016/0111954 A1* | 4/2016 | Bach ............. H04R 3/00 381/113 |
| 2016/0157036 A1* | 6/2016 | Wiesbauer ..... H04R 29/004 381/58 |

FOREIGN PATENT DOCUMENTS

| JP | H0758616 A | 3/1995 |
| JP | 2007198252 A | 7/2007 |

* cited by examiner

*Primary Examiner* — David Ton
(74) *Attorney, Agent, or Firm* — The Noblitt Group, PLLC; Hettie L. Haines

(57) ABSTRACT

Various embodiments of the present technology may comprise methods and apparatus for controlling a bias voltage. Methods and apparatus for controlling a bias voltage to an electrical device according to various aspects of the present invention may operate in conjunction with a charge pump and a voltage regulator. A pulse generator may be employed to vary the output voltage of the voltage regulator, which in turn, varies the output voltage (bias voltage) generated by the charge pump. The pulse generator may be activated at the start-up of the electrical device.

20 Claims, 10 Drawing Sheets

METHODS AND APPARATUS FOR CONTROLLING A BIAS VOLTAGE

BACKGROUND OF THE TECHNOLOGY

Many electrical systems require a high bias voltage to generate an appropriate input/output signal. For example, in a MEMS (micro electro-mechanical system) microphone system, the bias voltage required to convert an acoustic signal into an electrical signal is approximately 10V-15V. In general, the bias voltage must reach a target value with a specified period of time, for example within milliseconds after start-up, to achieve a stable input/output signal. When an electrical system does not receive the required bias voltage within the specified period of time, the input/output signal of the system may be diminished and may exhibit a low signal-to-noise ratio. Conventional methods employed for reducing noise in the signal, such as a low-pass filter, may introduce other negative effects. For example, low-pass filters generally exhibit a large time constant, which interferes with the stabilization of the input/output signal. Other systems may include additional control terminals to control the bias voltage, which increases the size and cost of the system.

SUMMARY OF THE INVENTION

Various embodiments of the present technology may comprise methods and apparatus for controlling a bias voltage. Methods and apparatus for controlling a bias voltage to an electrical device according to various aspects of the present invention may operate in conjunction with a charge pump and a voltage regulator. A pulse generator may be employed to vary the output voltage of the voltage regulator, which in turn, varies the output voltage (bias voltage) generated by the charge pump. The pulse generator may be activated at the start-up of the electrical device.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various filters, amplifiers, signal converters, drivers, and semiconductor devices, such as transistors, capacitors, and the like, which may carry out a variety of functions. In addition, the present technology may be practiced in conjunction with any number of electronic systems, such as automotive, aviation, "smart devices," portables, and consumer electronics, and the systems described are merely exemplary applications for the technology. Further, the present technology may employ any number of conventional techniques for pulse generation, clock signal generation, voltage regulation, and the like.

Methods and apparatus for controlling a bias voltage according to various aspects of the present technology may operate in conjunction with any suitable electronic system, such as an audio system, a microphone system, a video telephone, an acoustics system, hearing devices, and the like.

Figure 1:
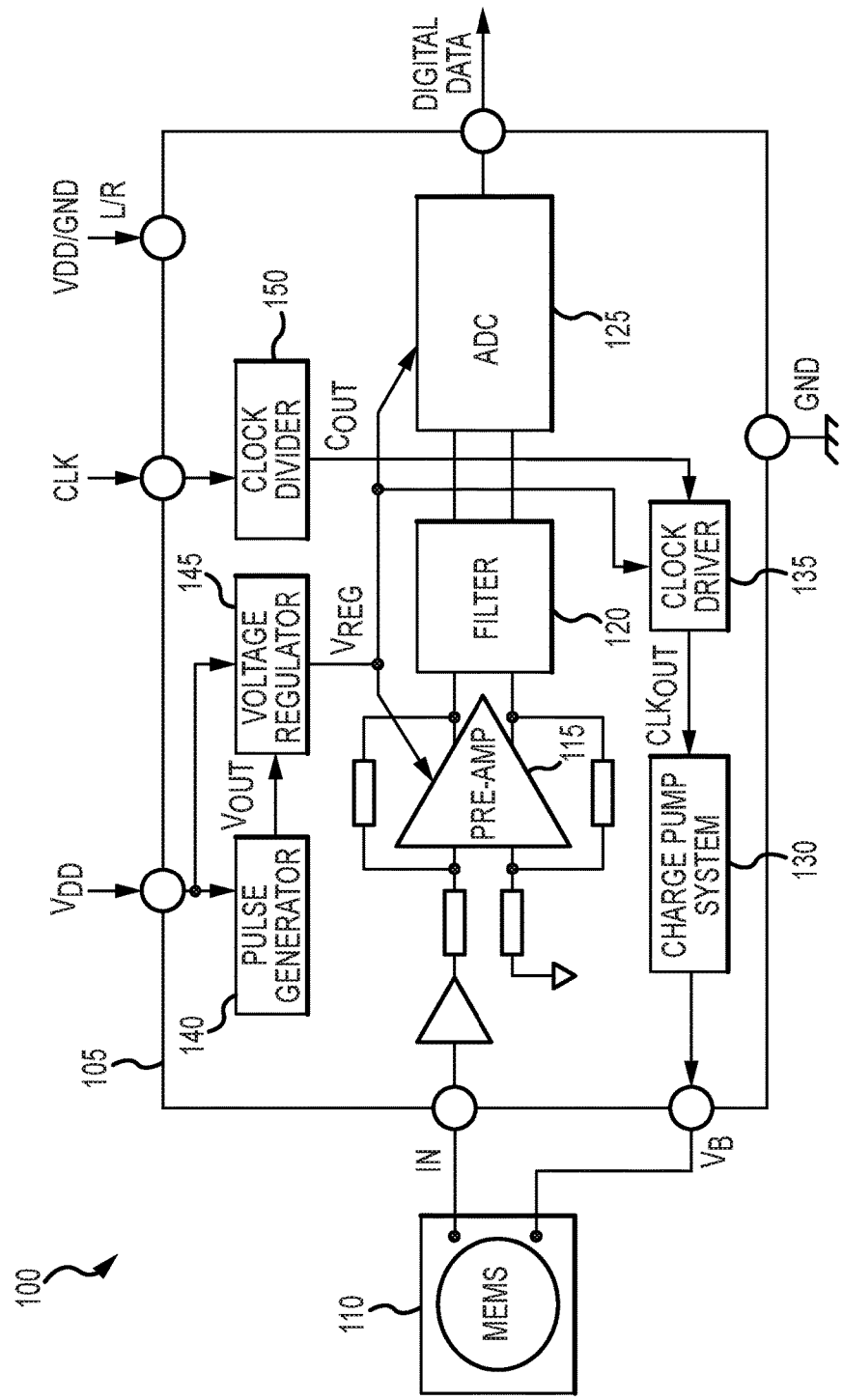
FIG. 1 is a block diagram of a system in accordance with an exemplary embodiment of the present technology.

Referring to FIG. 1, an electronic device according to various aspects of the present technology may comprise an audio system 100 configured to detect and process sound. For example, the system 100 may comprise a micro electro-mechanical system (MEMS) device 110 coupled to an integrated circuit (IC) 105. In various embodiments, the MEMS device 110 and the IC 105 may be integrated on a single chip.

In various embodiments, the MEMS device 110 may convert acoustic pressure waves into an electrical signal, for example an analog electrical signal with the use of a flexible diaphragm. The MEMS device 110 may be fabricated using conventional MEMS processing techniques. The source of the analog signal may comprise, however, any suitable source of analog signals, such as a microphone, sensor, or signal generator.

The IC 105 may be coupled to the MEMS device 110 to provide a bias voltage $V_B$ and to receive an input signal IN from the MEMS device 110. The IC 105 may comprise various circuits and/or systems suitably configured to process the input signal IN, regulate the voltage of various circuits and/or systems, and generate the bias voltage. The IC 105 may be configured to receive supply voltages, such as a positive supply voltage $V_{DD}$, and a reference voltage, such as a ground GND and a negative supply voltage $V_{SS}$. In an exemplary embodiment, the IC 105 may comprise a pulse generator circuit 140, a voltage regulator circuit 145, a clock divider circuit 150, a clock driver circuit 135, and a charge pump system 130, which operate in conjunction with each other to generate the bias voltage $V_B$.

In various embodiments, the IC 105 may be further coupled to or include a clock generator or other timing circuit (not shown) for producing a clock signal CLK. The clock signal CLK may be transmitted to an input terminal of the IC 105. The clock generator may produce a symmetrical square wave and/or other suitable waveforms. In various embodiments, the clock generator may be formed from a resonant circuit and an amplifier. The clock generator may be formed on the same chip as the IC 105 or on a companion chip.

The clock divider circuit 150 may be configured to receive an input clock signal CLK with an input frequency $f_{in}$ and generate an output clock signal, such as a clock divider output signal $C_{OUT}$, with an output frequency $f_{out}$, such as described by: $f_{out}=f_{in}/n$, where n is an integer. The clock divider circuit 150 may comprise any suitable components, logic gates, semiconductor devices, and the like to generate a desired output signal with a desired frequency, given a particular input signal. The clock divider 150 may produce a symmetrical square wave or other suitable waveforms. The n value may be selected according to any suitable parameter, such as the particular application, power consumption limitations, and the like. In an exemplary embodiment, the clock divider circuit 150 is coupled to and transmits the clock divider output signal $C_{OUT}$ to the clock driver circuit 135.

Figure 6A:
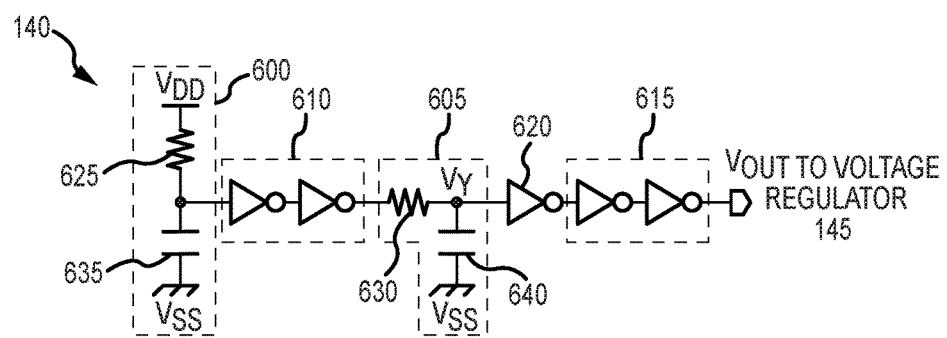
FIG. 6A is a circuit schematic of a pulse generator in accordance with an exemplary embodiment of the present technology.

The pulse generator circuit 140 generates a control signal $V_{out}$. The pulse generator circuit 140 may comprise any circuit capable of generating a pulse with a maximum voltage value $V_{max}$ at a start-up (e.g., when the positive supply voltage $V_{DD}$ is applied) of the system 100. For example, referring to FIG. 6A, the pulse generator circuit 140 may comprise a first RC network 600 comprising a first capacitor 635 in series with a first resistor 625, and a second RC network 605 comprising a second capacitor 640 in series with a second resistor 630. The first and second RC networks 600, 605 are coupled via a first inverter chain 610. The pulse generator circuit 140 may further comprise a conventional Schmitt trigger 620 and a second inverter chain 615, wherein the Schmitt trigger 620 is coupled between the second RC network and the second inverter chain 615.

The maximum voltage value $V_{max}$ may be selected according to a particular application, desired bias voltage, and the like, and is influenced by the values of the first and second resistors 625, 630 and the first and second capacitors 635, 640. As such, the values of the first and second resistors 625, 630 and the first and second capacitors 635, 640 may be chosen to produce a particular maximum voltage value $V_{max}$.

Referring to FIGS. 1 and 6A-C, according to an exemplary embodiment, the pulse generator circuit 140 generates a rectangular pulse having a pulse width. The pulse generator circuit 140 may be coupled to the positive supply voltage $V_{DD}$ and the negative supply voltage $V_{SS}$. The pulse width may be adjusted by the first and second RC networks 600, 605. In general, the pulse width changes by the adjustment of the time constant of the second RC network 605. The slope of $V_Y$ changes by the values of the second resistor 630 and the second capacitor 640, and thus the pulse width also changes. The values of the second resistor 630 and the second capacitor 640 may be chosen to produce a particular pulse width. The pulse generator circuit 140 may be further coupled to and configured to transmit the control signal $V_{out}$ to the voltage regulator circuit 145. In an exemplary embodiment, the pulse generator circuit 140 may be integrated within the IC 105, however in an alternative embodiment, the pulse generator circuit 140 may be formed on a companion chip outside the IC 105.

Figure 4A:
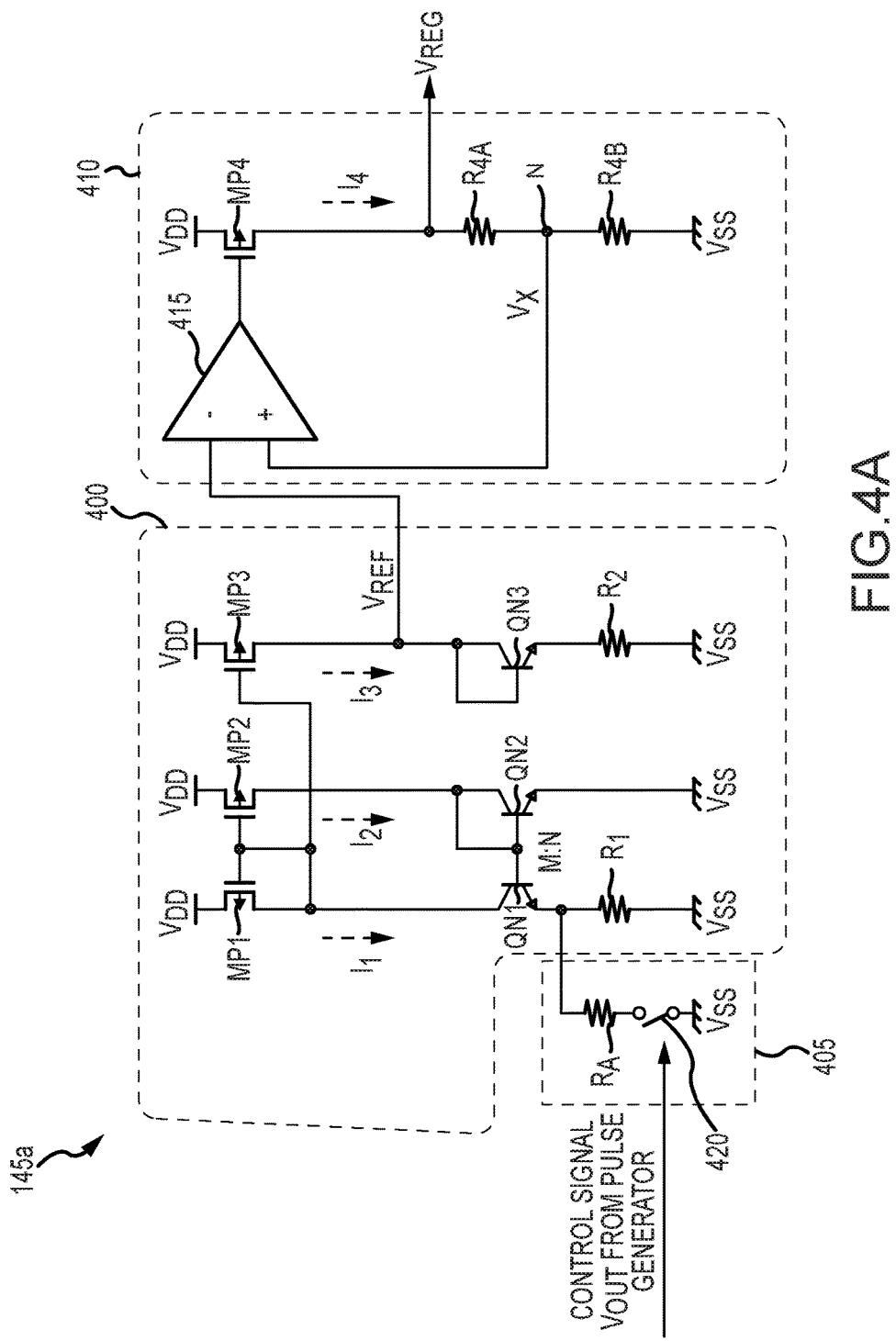
FIG. 4A is circuit schematic of a voltage regulator in accordance with a first exemplary embodiment of the present technology.
Figure 4B:
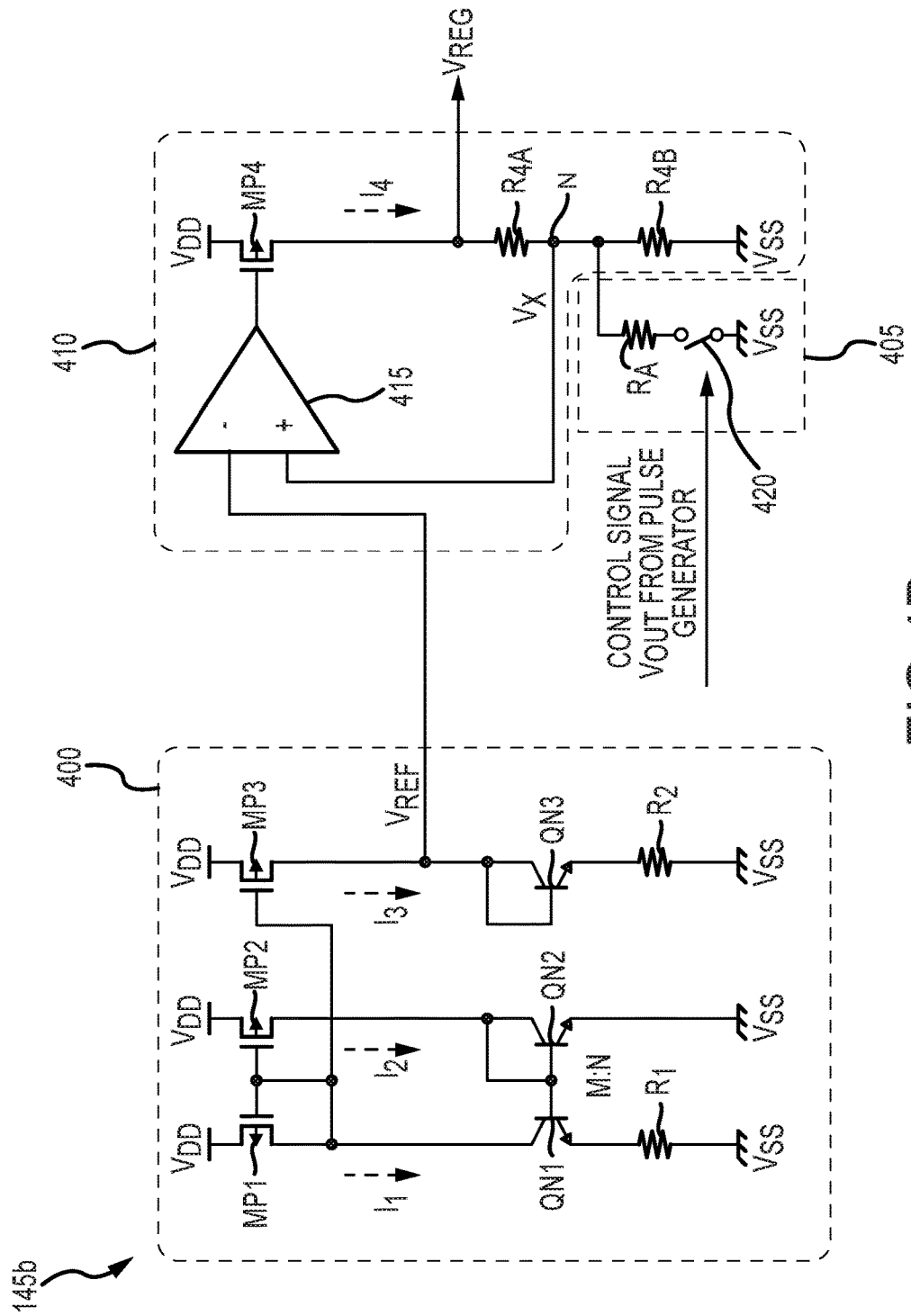
FIG. 4B is circuit schematic of a voltage regulator in accordance with a second exemplary embodiment of the present technology.

Referring to FIGS. 4A-B, according to various embodiments, the voltage regulator circuit 145 generates a reference voltage $V_{REF}$ and a regulator voltage $V_{REG}$. According to various embodiments, the voltage regulator 145 operates in conjunction with the clock driver 135 and the charge pump system 130 to adjust the bias voltage $V_B$. According to various embodiments, the system 100 increases the bias voltage $V_B$ for a period of time immediately after start-up, For example, according to various embodiments, the voltage regulator circuit 145 may generate a variable regulator voltage $V_{REG}$ based on the control signal $V_{out}$ from the pulse generator circuit 140. In an exemplary embodiment, the reference voltage $V_{REF}$ and the regulator voltage $V_{REG}$ may be proportional to the control signal $V_{out}$. The voltage regulator circuit 145 may be coupled to and configured to transmit the regulator voltage $V_{REG}$ to the charge pump system 130 via the clock driver 135. Therefore, variations in the reference voltage $V_{REF}$ and the regulator voltage $V_{REG}$ affect the bias voltage $V_B$. For example, as the reference voltage $V_{REF}$ increases, the regulator voltage $V_{REG}$ also increases, and the bias voltage $V_B$ also increases.

Figure 4C:
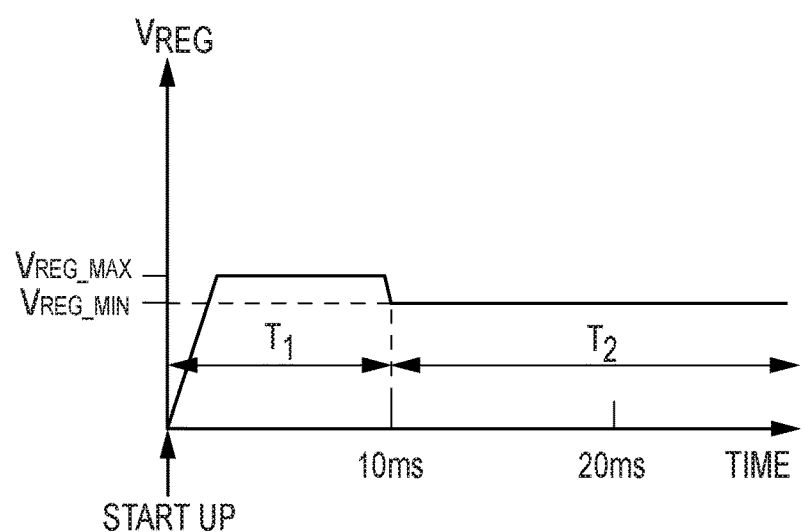
FIG. 4C is a graph illustrating an output voltage of the voltage regulator versus time in accordance with an exemplary embodiment of the present technology.

Referring to FIGS. 4A-4C, the voltage regulator circuit 145 may comprise any appropriate circuit and/or system to generate the reference voltage $V_{REF}$ according to the control signal $V_{out}$, including any appropriate number and type of transistors, capacitive elements, resistive elements, and the like. In an exemplary embodiment, the voltage regulator circuit 145 comprises a primary circuit 400, a secondary circuit 410, and a switching circuit 405.

The switching circuit 405 selectively couples one of the primary circuit 400 and the secondary circuit 410 to a reference voltage, such as the negative supply voltage $V_{SS}$, according to the control signal $V_{out}$ from the pulse generator 140, to effect a change in the reference voltage $V_{REF}$ and the regulator voltage $V_{REG}$. In various embodiments, the switching circuit 405 may comprise a switch 420 responsive to the control signal $V_{out}$ and a resistor $R_4$, and the switch 420 may be coupled in series with the resistor $R_4$. For example, the switch 420 may operate according to the control signal $V_{out}$ to couple/decouple the resistor $R_4$ to/from the negative supply voltage $V_{SS}$. In one embodiment, and referring to FIG. 4A, the switching circuit 405 may be coupled to the primary circuit 400. In an alternative embodiment, and referring to FIG. 4B, the switching circuit 405 may be coupled to the secondary circuit 410.

An exemplary voltage regulator circuit 145 may comprise the primary circuit 400 for generating a variable reference voltage $V_{REF}$. For example, the primary circuit 400 may be configured as a band-gap reference circuit. According to various embodiments, the switching circuit 405 is coupled to one of the primary circuit 400 and the secondary circuit 410 to effect a change in the regulator voltage $V_{REG}$.

According to various embodiments, the primary circuit 400 may comprise a plurality of transistors MP1, MP2, MP3, QN1, QN2, QN3 and a plurality of resistive elements, such as resistors $R_1$, $R_2$. The transistor QN1 has a base-emitter voltage $V_{BE1}$, the transistor QN2 has a base-emitter voltage $V_{BE2}$, the transistor QN3 has a base-emitter voltage $V_{BE3}$, the transistor QN1 has a collector current $I_1$, the transistor QN2 has a collector current $I_2$, and the transistor QN3 has a collector current $I_3$. Therefore:

$$V_{BE2} = V_{BE1} + R_1 \times I_1 \quad \text{(equation 1)}.$$

In addition, the transistors MP1 and MP2 have drain currents of $I_1$, $I_2$, respectively, and if transistors MP1 and MP2 are equally sized, then $I_2 = I_1$. Further, a size ratio of transistors QN1 and QN2 is described by M:N. Therefore, the following is true:

$$V_{BE2} - V_{BE1} = \frac{k \times T}{q} \times \ln\left(\frac{M}{N}\right). \quad \text{(equation 2)}$$

And, therefore, $I_1$ can be written as:

$$I_1 = \frac{1}{R_1} \times \frac{k \times T}{q} \times \ln\left(\frac{M}{N}\right), \quad \text{(equation 3)}$$

where k is Boltzmann's constant, T is temperature in Kelvin, and $V_{BE1}$ is a base-emitter voltage of transistor QN1, q is the magnitude of the electrical charge on the electron, and M and N are the number of transistors that equal the equivalent transistors QN1 and QN2, respectively.

If transistors MP2 and MP3 are equally sized, then $I_3 = I_2 = I_1$, and therefore:

$$I_3 = I_1 = \frac{1}{R_1} \times \frac{k \times T}{q} \times \ln\left(\frac{M}{N}\right), \quad \text{(equation 4)}$$

and the reference voltage $V_{REF}$ may be described as follows:

$$V_{REF} = V_{BE3} + R_2 \times I_3 \quad \text{(equation 5), and}$$

$$V_{REF} = V_{BE3} + \frac{R_2}{R_1} \times \frac{k \times T}{q} \times \ln\left(\frac{M}{N}\right). \quad \text{(equation 6)}$$

The primary circuit 400 may exhibit various temperature characteristics. For example, the reference voltage $V_{REF}$ can be adjusted to a desired temperature coefficient by, for example, adjusting the value of the resistors $R_1$, $R_2$ since the temperature coefficient of a base-emitter voltage $V_{BE1}$ is a negative value (e.g., approximately $-2$ mV/° C.) and the temperature coefficient of a thermal voltage $V_T$, where $V_T = (k*T)/q$, is a positive value (e.g., approximately 0.09 mV/° C.). Therefore, resistors $R_1$, $R_2$ may be adjusted to remove the effects of the thermal voltage by setting $R_2$ equal to q and $R_1$ equal to k×T, and the currents $I_1$ and $I_3$ can be set to a desired value. In addition, since the reference voltage $V_{REF}$ does not depend on the positive supply voltage $V_{DD}$, the primary circuit 400 is capable of producing an accurate reference voltage $V_{REF}$.

The secondary circuit 410 may be configured to generate the regulator voltage $V_{REG}$. The secondary circuit may be coupled to the primary circuit 400 and configured to receive the reference voltage $V_{REF}$. In this way, the reference voltage $V_{REF}$ affects the regulator voltage $V_{REG}$. In various embodiments, the secondary circuit 410 may comprise any suitable components that are capable of operating in conjunction with each other to generate the regulator voltage $V_{REG}$ according to the reference voltage. For example, according to various embodiments, the secondary circuit 410 may comprise an operational amplifier (op-amp) 415 to provide a high DC gain, a transistor MP4, and various resistors, such as resistors $R_{4A}$, $R_{4B}$. The resistors $R_{4A}$, $R_{4B}$ and the transistor MP4 may be coupled in series. The secondary circuit 410 may comprise a feedback loop connecting a node N between the resistors to a non-inverting terminal (+) of the op-amp 415. The primary circuit 400 may be coupled to the secondary circuit 410 via an inverting terminal ($-$) of the op-amp 415, wherein the op-amp is configured to receive the reference voltage $V_{REF}$.

According to various embodiments, a relationship between the regulator voltage $V_{REG}$ and the reference voltage $V_{REF}$ may be described as:

$$V_{REG} = \left(\frac{R_{4A}}{R_{4B}} + 1\right) \times V_X. \quad \text{(equation 7)}$$

and since a DC gain of an operational amplifier is very high, $$V_{REG} = \left(\frac{R_{4A}}{R_{4B}} + 1\right) \times V_{REF}. \quad \text{(equation 8)}$$

According to one embodiment, and referring to FIG. 4A, where the switching circuit 405 is coupled to the primary circuit 400, for example between the transistor QN1 and resistor $R_1$, an equivalent resistance Rx can be calculated as follows:

$$R_X = \frac{R_1 \times R_A}{R_1 + R_A} < R_1. \quad \text{(equation 9)}$$

Therefore the voltage reference $V_{REF}$ may be described by:

$$V_{REF} = V_{B3} + \frac{R_2}{R_X} \times \frac{k \times T}{q} \times \ln\left(\frac{M}{N}\right), \quad \text{(equation 10)}$$

where the reference voltage $V_{REF}$ varies according to the control signal $V_{OUT}$ from the pulse generator circuit 140. As a result, the regulation voltage $V_{REG}$ varies as the reference voltage $V_{REF}$ varies, and the reference voltage $V_{REF}$ varies according to the control signal $V_{OUT}$. Therefore, operation of the pulse generator circuit 140 has an effect on the reference voltage $V_{REF}$, the regulator voltage $V_{REG}$, and the bias voltage $V_B$.

Figure 5A:
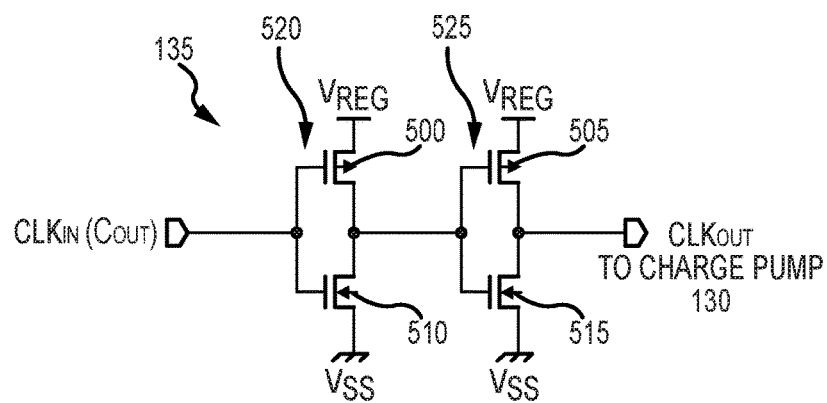
FIG. 5A is a circuit schematic of a clock driver in accordance with an exemplary embodiment of the present technology.
Figure 5B:
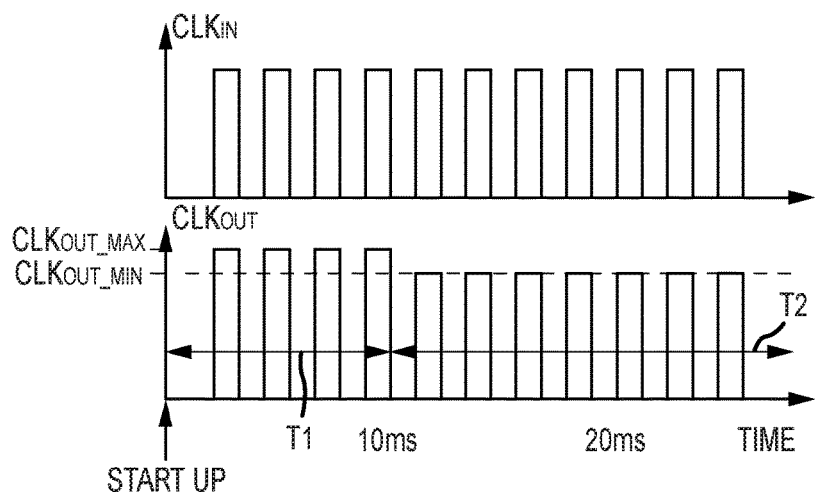
FIG. 5B is a graph illustrating input and output clock values of the clock driver versus time in accordance with an exemplary embodiment of the present technology.

According to an alternative embodiment, and referring to FIG. 5B, where the switching circuit 405 is coupled to the secondary circuit 410, for example the node N of the secondary circuit 410, an equivalent resistance $R_Y$ can be calculated as follows:

$$R_Y = \frac{R_{4B} \times R_A}{R_{4B} + R_A} < R_{4B}. \quad \text{(equation 11)}$$

Therefore the voltage reference $V_{REF}$ may be described by:

$$V_{REG} = \left(\frac{R_{4A}}{R_Y} + 1\right) \times V_{REF}.  \quad \text{(equation 12)}$$

As a result, the regulation voltage $V_{REG}$ varies as the reference voltage $V_{REF}$ varies, and the reference voltage $V_{REF}$ varies according to the control signal $V_{OUT}$. Therefore, operation of the pulse generator circuit 140 and resulting control signal $V_{OUT}$ has an effect on the reference voltage $V_{REF}$, the regulator voltage $V_{REG}$, and the bias voltage $V_B$.

The clock driver 135 generates a signal with various voltage levels at predetermined rise and fall times. For example, and referring to FIGS. 5A-B, the clock driver 135 may receive a clock driver input signal $CLK_{IN}$, such as the clock driver output signal $C_{OUT}$, and generate a clock driver output signal $CLK_{OUT}$. In an exemplary embodiment, the clock driver 135 may comprise a first inverter 520 coupled to a second inverter 525 (also referred to as a non-inverting buffer). The first inverter 520 may comprise a first transistor 500 coupled in series with a second transistor 510, and the second inverter 525 may comprise a third transistor 505 coupled in series with a fourth transistor. The first and third transistors 500, 505 may be configured as PMOS transistors, and the first and fourth transistors 510, 515 may be configured as NMOS transistors. The first and second inverters 520, 525 may be coupled to the voltage regulator circuit 145 and receive the regulator voltage $V_{REG}$. Accordingly, a voltage level of the clock output signal $CLK_{OUT}$ may be commensurate with the regulator voltage $V_{REG}$.

Figure 3A:
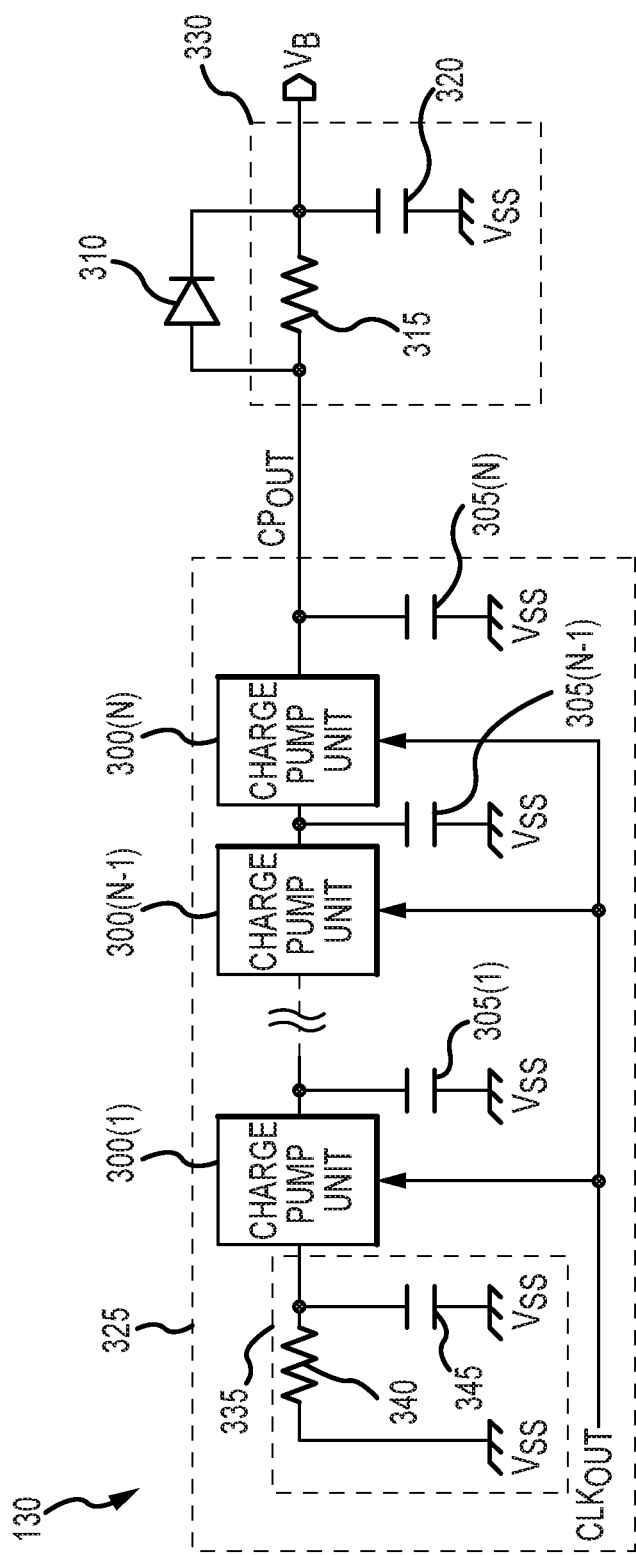
FIG. 3A is a circuit schematic of a charge pump system in accordance with an exemplary embodiment of the present technology.
Figure 3B:
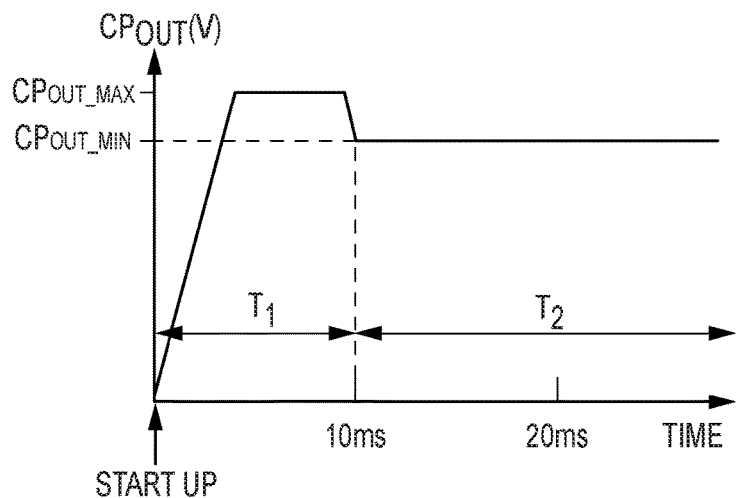
FIG. 3B is a graph illustrating an output voltage of the charge pump system versus time in accordance with an exemplary embodiment of the present technology.
Figure 3C:
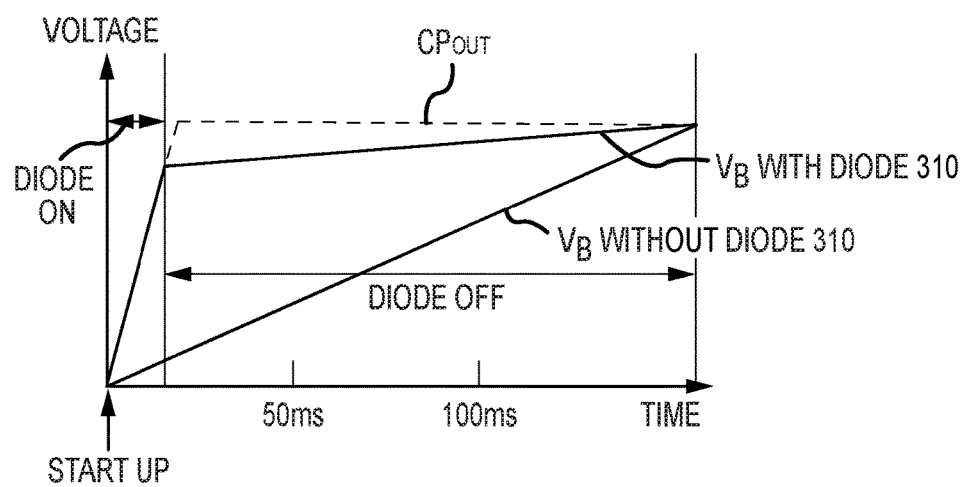
FIG. 3C is a graph illustrating a bias voltage of the charge pump system versus time, and a bias voltage of a conventional charge pump system versus time in accordance with an exemplary embodiment of the present technology.

The charge pump system 130 generates the bias voltage $V_B$ according to the clock driver output signal $CLK_{OUT}$. The charge pump system 130 may be configured to generate a higher voltage from a lower voltage, generate the desired bias voltage $V_B$ within a short period of time (e.g., approximately 10-20 ms), and remove noise from intermediate signals. For example, and referring to FIGS. 3A-C, the charge pump system 130 may comprise a charge pump 325, a low-pass filter 330, and a diode 310.

The charge pump circuit 325 may be configured to generate a charge pump output $CP_{OUT}$ (i.e., the intermediate signal), wherein the charge pump output $CP_{OUT}$ is greater than the positive supply voltage $V_{DD}$. In an exemplary embodiment, the charge pump circuit 325 may comprise a conventional charge pump circuit with a plurality of charge pump units 300(1):300(N) and a plurality of capacitors 305(1):305(N). The charge pump output $CP_{OUT}$ may be described according to the following: $CP_{OUT}$=[unit number] *$V_{DD}$. Accordingly, the number of charge pump units may be selected according to the particular application, desired charge pump output $CP_{OUT}$, and other relevant factors. In addition, the charge pump circuit 325 may comprise an integrator circuit 335, such as an RC network, to facilitate proper functioning of the charge pump circuit 325 during start-up and/or operation. The integrator circuit 335 may comprise a resistor 340 and capacitor 345. The integrator circuit 335 may be coupled directly to one of the charge pump units 300, for example, a first charge pump unit 300(1). Moreover, a first end of the resistor 340 may be coupled to the same reference voltage as the charge pump circuit 325, such as a ground GND, and the capacitor 345 may be coupled to the negative supply voltage $V_{SS}$.

The low-pass filter 330 may be configured to attenuate various frequencies in the bias voltage $V_B$. For example, in an exemplary embodiment, the low-pass filter 330 is coupled to the charge pump circuit 325 and configured to receive the charge pump output $CP_{OUT}$. In an exemplary embodiment, the low-pass filter 330 has a low cut-off frequency to remove noise from the charge pump output $CP_{OUT}$ and thus provide a bias voltage $V_B$ with minimal noise. The low-pass filter 330 may comprise a resistor 315 in series with a capacitor 320. The low-pass filter 330 may further have a time constant $T_C$ (in seconds) described by: $T_C$=C*R, where C is a capacitance value of the capacitor 320 and R is a resistance value of the resistor 315.

The diode 310 may be configured to provide the desired bias voltage $V_B$ within a short period of time and reduce the effects (the long time constant $T_C$) of the low-pass filter 330. For example, the diode 310 may be coupled in parallel with the resistor 315. In this way, the diode 310 acts as a short circuit and provides increased current flow, and thus, reduces the effect that the time constant $T_C$ has on the bias voltage $V_B$. As a result, the bias voltage $V_B$ increases quickly after start-up.

The diode 310 may be configured as a forward-biased diode with a threshold voltage of approximately 0.5-0.7V. For example, and referring to FIG. 3C, a conventional charge pump system 130 that does not incorporate the diode 310 has a bias voltage $V_B$ that increases linearly, while a conventional charge pump system 130 that incorporates the diode 310 in parallel with the low-pass filter 330 has a bias voltage $V_B$ that increases quickly after start-up and then continues to increase but at a slower rate. The quick increase in the bias voltage $V_B$ after start-up and slowed increase later is the result of the diode 310 being ON after start-up and turning OFF later due to the reverse bias applied by the capacitor 320. Accordingly, the bias voltage $V_B$ does not follow the charge pump output $CP_{OUT}$ and does not reach the target value until some later time due to the time constant Tc of the low-pass filter 330.

According to various embodiments, referring again to FIG. 1, the IC 105 may further comprise various circuits and/or systems to process the input signal IN and convert it to a digital signal (i.e., digital data). For example, the system 100 may comprise a preamplifier 115, a filter 120, and a signal converter, such as an ADC 125. The input signal IN from the MEMS device 110 may be coupled, directly or indirectly, to the IC 105 for processing. In various embodiments, the preamplifier 115, the filter 120, and the ADC 125 may be coupled in series.

The preamplifier 115 may amplify the input signal IN. The preamplifier 115 may comprise any suitable circuit and/or system to receive in the input signal IN and transmit an amplified signal to the filter 120. The preamplifier 115 may be configured in any suitable manner for the particular application and/or environment.

In various embodiments, the IC 105 may process the input signal IN prior to the analog-to-digital conversion, for example to inhibit aliasing and/or produce a signal with a desired precision. For example, the filter 120 may comprise a low-pass filter to pass input analog signals with frequencies below a predetermined frequency and attenuate signals with frequencies above a predetermined frequency. In various embodiments, the filter 120 may be configured as an analog filter and may be fabricated using passive elements, such as a resistive element (not shown) and/or a capacitor (not shown), for example because such passive elements may be small in size and consume less current than active elements, such as a transistor. In an exemplary embodiment, filter 120 is configured to receive the amplified signal from the preamplifier 115.

The ADC 125 may convert an analog signal into a digital signal. In various embodiments, the ADC 125 may comprise any suitable circuit for converting the input signal IN into a digital signal (i.e., digital data). For example, the ADC 125 may comprise a delta-sigma ADC or other suitable ADC architecture. The ADC 125 may be coupled in series with the filter 120 and/or the pre-amplifier 115. The ADC 125 may be configured in any suitable manner for the particular application and/or environment.

In operation, the IC 105 may generate a bias voltage $V_B$ that reaches the target value within a short period of time after start-up and maintains the target value. As a result, the input signal IN exhibits improved signal quality, which leads to more accurate digital data. According to various embodiments, the IC 105 may be configured to generate various signals that are capable of being adjusted after start-up of the system 100.

In an exemplary operation, and referring to FIGS. 1-6, upon start-up of the system 100, the pulse generator circuit 140 receives the supply voltage $V_{DD}$ and the pulse generator circuit 140 generates the control signal $V_{OUT}$. The control signal $V_{OUT}$ reaches a maximum value $V_{OUT\_MAX}$ (i.e., control signal maximum value) within a first period $T_1$. In an exemplary embodiment, the control signal $V_{OUT}$ forms a square pulse. The pulse generator circuit 140 transmits the control signal $V_{OUT}$ to the voltage regulator circuit 145. The voltage regulator circuit 145 responds to the control signal $V_{OUT}$ and generates the regulator voltage $V_{REG}$ according to the control signal $V_{OUT}$. For example, when the control signal $V_{OUT}$ is high ("ON"), the reference voltage $V_{REF}$ reaches a maximum value and the regulator voltage $V_{REG}$ reaches a maximum value. Alternatively, when the control signal is low ("OFF"), the reference voltage $V_{REF}$ reaches a minimum value and the regulator voltage $V_{REG}$ reaches a minimum value.

Figure 6B:
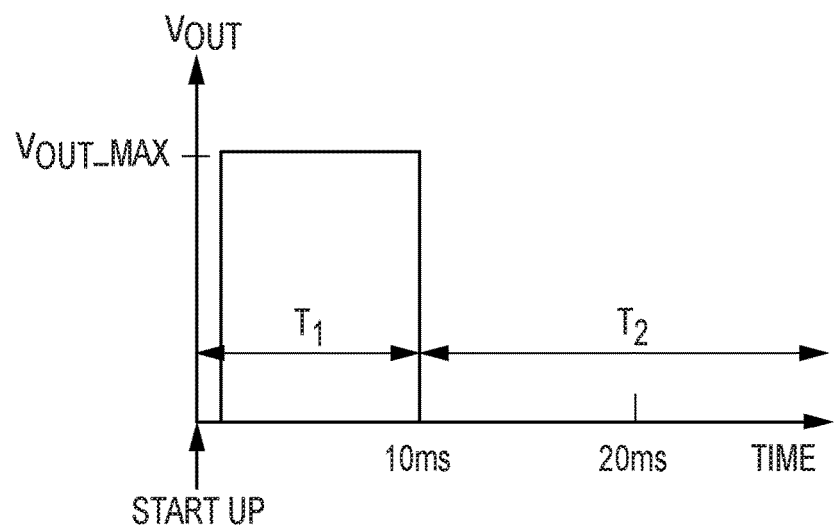
FIG. 6B is a graph illustrating an output voltage of the pulse generator circuit versus time in accordance with an exemplary embodiment of the present technology.
Figure 6C:
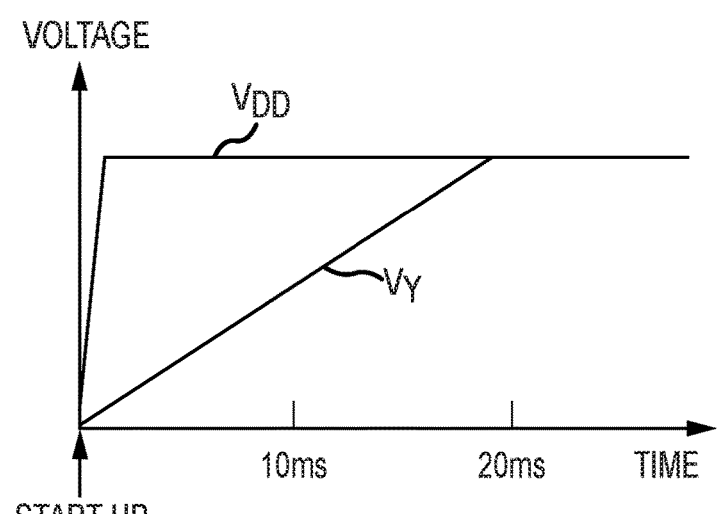
FIG. 6C is a graph illustrating a supply voltage of the pulse generator circuit versus time and an intermediate voltage of the pulse generator circuit versus time in accordance with an exemplary embodiment of the present technology.

In an exemplary embodiment, during the first period $T_1$, and referring to FIGS. 4C and 6B, when the control signal $V_{OUT}$ is at the maximum value $V_{OUT\_MAX}$, the regulator voltage $V_{REG}$ increases and reaches a maximum value $V_{REG\_MAX}$ (i.e., regulator maximum value) when the control signal $V_{OUT}$ reaches its maximum value $V_{OUT\_MAX}$ (i.e., control signal maximum value). When the control signal $V_{OUT}$ returns to zero, the regulator voltage $V_{REG}$ shifts to a minimum value $V_{REG\_MIN}$ (i.e., regulator minimum value) during a second period $T_2$. The second period $T_2$ may immediately follow the first period $T_1$. The voltage difference between the regulator maximum value $V_{REG\_MAX}$ and the regulator minimum value $V_{REG\_MIN}$ may be set to be equal to the threshold voltage of the diode 310 divided by the total number (N) of charge pump units in the charge pump circuit 325 (i.e., $(V_{REG\_MAX} - V_{REG\_MIN})$=[threshold voltage of diode 310]/[N charge pump units]).

During the first period $T_1$ and after as the pulse generator circuit 140 transmits the control signal $C_{OUT}$, the clock driver circuit 135 receives the regulator voltage $V_{REG}$ and the clock divider output signal $C_{OUT}$. The clock driver circuit 135 generates the clock driver output signal $CLK_{OUT}$ according to the regulator voltage $V_{REG}$ and the clock divider output signal $C_{OUT}$. In an exemplary embodiment, and referring to FIGS. 4C, 5B, and 6B, when the regulator voltage $V_{REG}$ is at the regulator maximum value $V_{REG\_MAX}$, the clock driver output signal $CLK_{OUT}$ reaches a maximum value $CLK_{OUT\_MAX}$ (i.e., clock driver maximum value) coincident with the regulator maximum value $V_{REG\_MAX}$ and the control signal maximum value $V_{OUT\_MAX}$. When the control signal $V_{OUT}$ returns to zero and the regulator voltage $V_{REG}$ returns to the regulator minimum value $V_{REG\_MIN}$, the clock driver output signal $CLK_{OUT}$ shifts to a minimum value $CLK_{OUT\_MIN}$ (i.e., clock driver output minimum value) during the second period $T_2$.

Figure 2A:
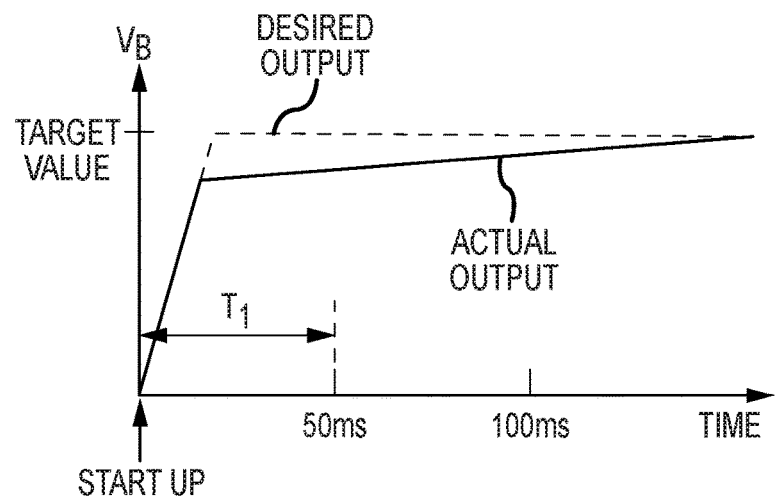
FIG. 2A is a desired bias voltage waveform and an actual bias voltage waveform of the system in accordance with an exemplary embodiment of the present technology.
Figure 2B:
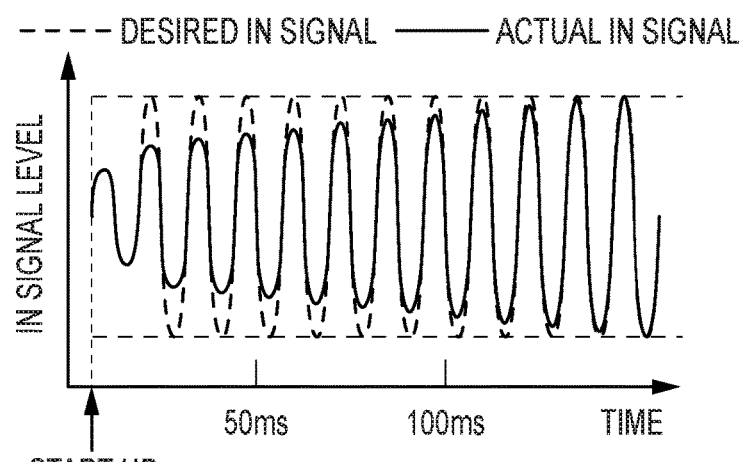
FIG. 2B is a desired input signal waveform and an actual input signal waveform of the system in accordance with an exemplary embodiment of the present technology.

During the first period $T_1$ and after the pulse generator circuit 140 transmits the control signal $C_{OUT}$, the charge pump system 130 receives the clock driver output signal $CLK_{OUT}$. In an exemplary embodiment, and referring to FIGS. 3B and 5B, the charge pump circuit 325 generates the charge pump output $CP_{OUT}$ according to the clock driver output signal $CLK_{OUT}$. The charge pump output $CP_{OUT}$ reaches a maximum value $CP_{OUT\_MAX}$ (i.e., charge pump maximum value) during the first period $T_1$ when the charge pump system 130 receives the clock driver output maximum $CLK_{OUT\_MAX}$. The charge pump system 130 then passes the charge pump output $CP_{OUT}$ through the low-pass filter 330 to pass desired frequencies and the diode 310 connected in parallel allows for quicker charging of the capacitor 320. The voltage difference between the charge pump maximum value $CP_{OUT\_MAX}$ and a charge pump minimum value $CP_{OUT\_MIN}$ may be set to be equal to the threshold voltage of the diode 310. Thus, the charge pump system 130 is able to generate a bias voltage $V_B$ that reaches the target value quicker than with a conventional IC and is able to maintain the target value because the regulator voltage $V_{REG}$ is adjusted to compensate for the threshold voltage of the diode 310 and the time constant of the low-pass filter 330 due to the OFF period of the diode 310 is diminished, which improves the input signal IN quality, for example as illustrated in FIGS. 2A and 2B.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An integrated circuit capable of generating a bias voltage, comprising:
   a pulse generator circuit configured to generate a control signal after start-up;
   a voltage regulator circuit coupled to the pulse generation circuit and configured to generate a regulator voltage in response to the control signal;
   a clock driver circuit coupled to the voltage regulator circuit and configured to generate a clock driver output signal in response to the regulator voltage; and
   a charge pump system coupled to the clock driver circuit and configured to generate the bias voltage in response to the clock driver output signal, wherein the bias voltage reaches a target value within a first period after start-up.

2. The integrated circuit according to claim 1, wherein:
   the clock driver circuit is further configured to receive a clock signal; and
   the clock driver circuit generates the clock driver output signal in response to the clock signal.

3. The integrated circuit according to claim 1, wherein the voltage regulator circuit comprises:
   a primary circuit configured to generate a reference voltage; and
   a secondary circuit coupled to the primary circuit and configured to generate the regulator voltage according to the reference voltage;
   wherein the regulator voltage is proportional to the reference voltage.

4. The integrated circuit according to claim 3, wherein at least one of the primary circuit and the secondary circuit is responsive to the control signal.

5. The integrated circuit according to claim 3, wherein:
   the voltage regulator circuit further comprises a switching circuit coupled to at least one of the primary circuit and the secondary circuit; and
   the switching circuit comprises a switch responsive to the control signal.

6. The integrated circuit according to claim 1, wherein the regulator voltage reaches a regulator maximum value during the first period and shifts to a regulator minimum value after the first period.

7. The integrated circuit according to claim 1, wherein the first period is within the range of 0 to 50 milliseconds immediately after start-up.

8. The integrated circuit according to claim 1, wherein the charge pump system comprises:
   a charge pump circuit configured to generate a charge pump output voltage and comprising:
     a plurality of charge pump units coupled to the clock driver output signal; and
     a integrator circuit directly coupled to one of the charge pump units;
   a low-pass filter coupled to an output terminal of the charge pump circuit; and
   a diode coupled in parallel with the low-pass filter.

9. The integrated circuit according to claim 8, wherein:
   the charge pump output voltage reaches a charge pump maximum value during the first period and shifts to a charge pump minimum value after the first period; and
   the difference between the regulator maximum value and the regulator minimum value is equal to a threshold voltage of the diode divided by the plurality of charge pump units.

10. A method for controlling a bias voltage, comprising:
    generating a voltage pulse after start-up;
    generating a regulator voltage in response to the voltage pulse;
    generating a clock driver output signal in response to the regulator voltage; and
    generating the bias voltage according to the clock driver output signal;
    wherein the bias voltage reaches a target value during a first period after start-up.

11. The method according to claim 10, wherein the first period is within the range of 0 to 50 milliseconds immediately after start-up.

12. The method according to claim 10, wherein the regulator voltage reaches a regulator maximum value during the first period and shifts to a regulator minimum value after the first period.

13. The method according to claim 10, further comprising generating a charge pump output voltage, wherein the charge pump output voltage reaches a charge pump maximum value during the first period and shifts to a charge pump minimum value after the first period.

14. The method according to claim 10, wherein the bias voltage maintains the target value after the first period.

15. The method according to claim 10, wherein generating the regulator voltage comprises operating a switching circuit according to the voltage pulse.

16. The method according to claim 10, further comprising generating a reference voltage, wherein the regulator voltage is proportional to the reference voltage.

17. An audio system, comprising:
    a micro electro-mechanical device;
    an integrated circuit coupled to the micro electro-mechanical device, comprising:
      a pulse generator circuit configured to generate a control signal after start-up;
      a voltage regulator circuit, coupled to the pulse generation circuit, comprising:
        a primary circuit configured to generate a reference voltage; and a secondary circuit coupled to the primary circuit and configured to generate a regulator voltage in response to at least one of the reference voltage and the control signal;

a clock driver circuit coupled to the voltage regulator circuit and configured to generate a clock driver output signal in response to the regulator voltage;

a charge pump system coupled to the clock driver circuit and configured to generate a bias voltage in response to the clock driver output signal;

wherein the bias voltage reaches a target value within a first period after start-up and maintains the target value after the first period.

18. The audio system according to claim 17, wherein the first period is within the range of 0 to 50 milliseconds immediately after start-up.

19. The audio system according to claim 17, wherein the regulator voltage reaches a regulator maximum value during the first period and shifts to a regulator minimum value after the first period.

20. The audio system according to claim 17, wherein:

the voltage regulator circuit further comprises a switching circuit coupled to at least one of the primary circuit and the secondary circuit; and the switching circuit comprises a switch responsive to the control signal.

* * * * *